June 14, 1949.　　　A. H. RODECK ET AL　　　2,473,449
CENTRIFUGAL GOVERNOR

Filed Sept. 28, 1944　　　4 Sheets-Sheet 1

INVENTOR
ARMIN H. RODECK AND ALBERT G. MASSEY
BY
Beau, Brooks, Buckley & Beau.
ATTORNEYS June 14, 1949. A. H. RODECK ET AL 2,473,449
CENTRIFUGAL GOVERNOR
Filed Sept. 28, 1944 4 Sheets-Sheet 2

INVENTOR.
ARMIN H. RODECK AND ALBERT G. MASSEY
BY
Beau, Brooks, Buckley & Beau.

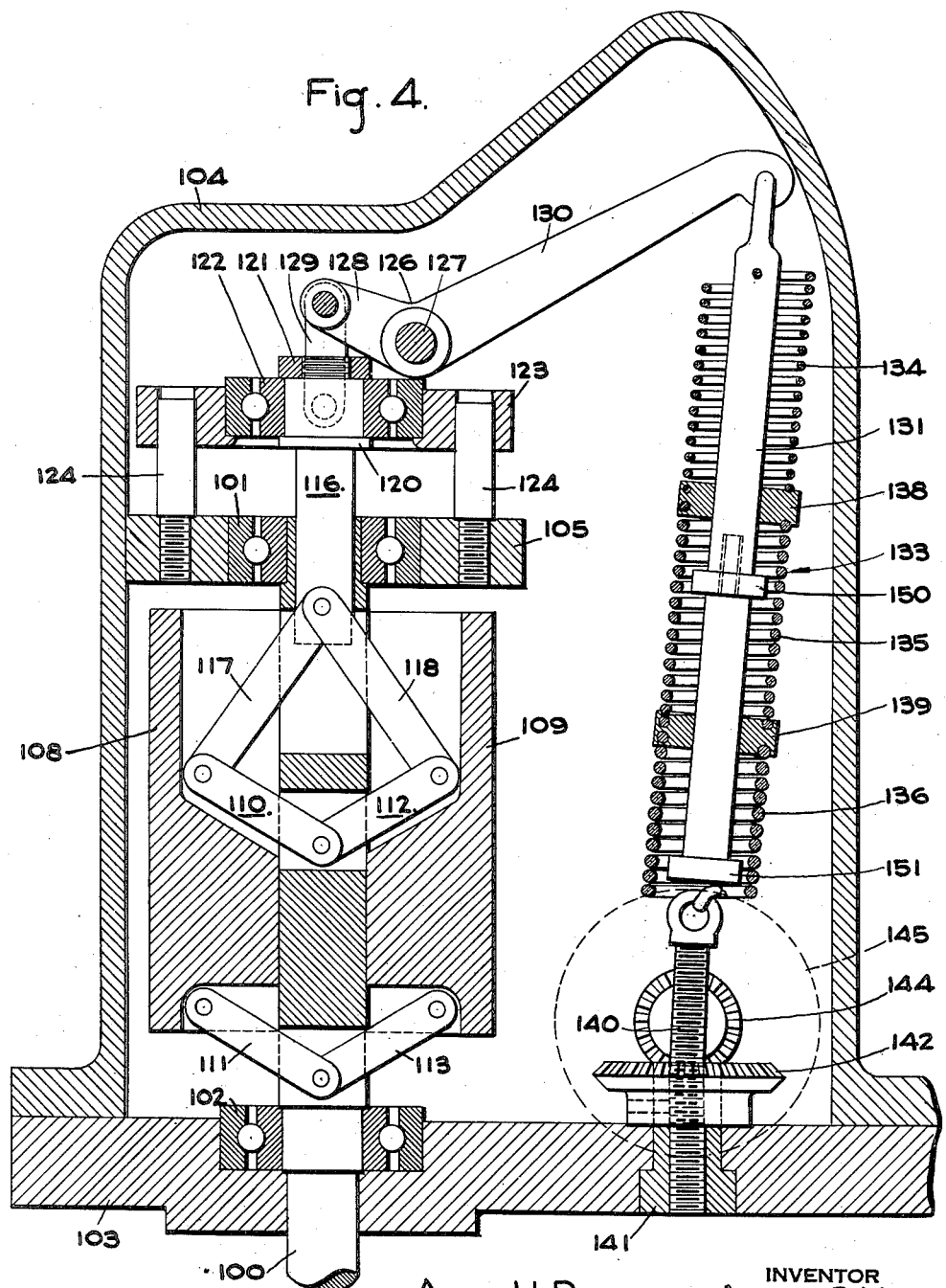

June 14, 1949.　　A. H. RODECK ET AL　　2,473,449
CENTRIFUGAL GOVERNOR
Filed Sept. 28, 1944　　　　　　　　　　　　　　　　4 Sheets-Sheet 4
Fig. 6.
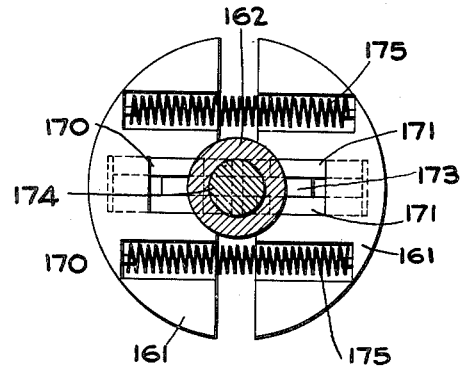
Fig. 7.
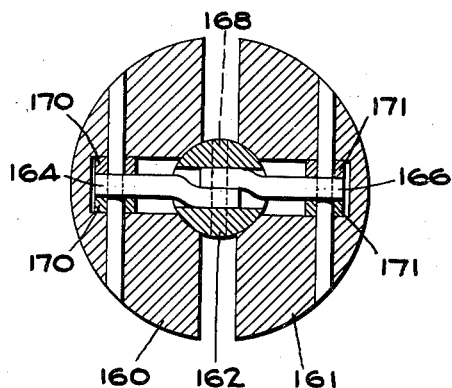
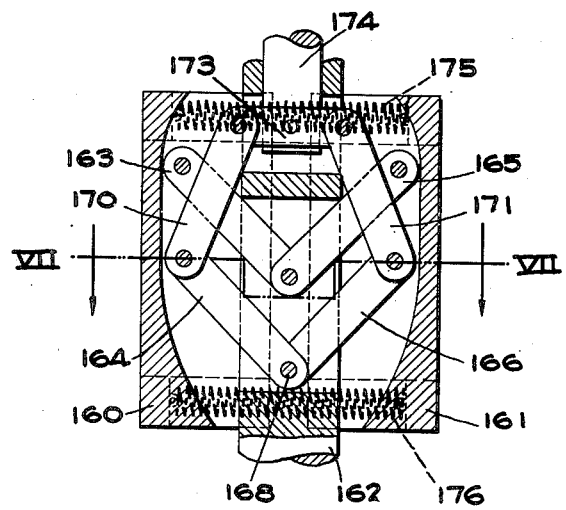
Fig. 5.
INVENTOR
ARMIN H. RODECK AND ALBERT G. MASSEY
BY
Beau, Brooks, Buckley & Beau, ATTORNEYS Patented June 14, 1949

2,473,449

UNITED STATES PATENT OFFICE 2,473,449

CENTRIFUGAL GOVERNOR

Armin H. Rodeck and Albert G. Massey, Watertown, N. Y., assignors to Massey Machine Company, Watertown, N. Y.

Application September 28, 1944, Serial No. 556,144

10 Claims. (Cl. 264—20)

This invention relates to speed regulating means and particularly to governors of the class wherein the varying centrifugal effect of varying speeds of rotation is employed in a flyweight mechanism to govern a prime mover or other apparatus.

The present invention provides novel governor flyweight arrangements and novel supporting means and the contemplated construction affords large masses for response to centrifugal forces within unusually small compass. Further, the governor flyweight supporting and controlling means is such that very minute changes in flyweight position automatically give a greatly magnified response to the speeder connecting means, so that very accurate governing is automatically made possible without any special necessity for unusual or extraordinary precision of manufacture. Further, the governor flyweight arrangement is such that the usual axial thrust components of mechanisms of this kind are balanced out in such a way as to be virtually eliminated.

In the governor constructions here proposed the speeder spring arrangement and support is likewise novel and provides novel means for controlling the sensitivity or degree of fluctuation of the governor, that is, the proportionate amount which the flyweights move in response to a given load or speed change. Provision is also made for setting the initial tension of the speeder spring to determine the speed setting of the governor and this setting may be freely varied during governor operation by manipulation of a knob located externally of the governor casing.

The flyweight arrangement of the governor of the present invention, in both of the exemplary forms illustrated herein, is such that the individual weights maintain a constant attitude during movement toward and away from the governor shaft; that is, they maintain their initial vertical position and do not revolve about central pivotal connections, as in conventional flyweight arrangements. This makes the calculation and prediction of governor behavior a far more exact procedure since the moments of inertia of the flyweight are functions only of their degree of movement, not a function complicated by change of attitude.

This relatively constant position of erectness of the flyweights, also makes it possible to construct the individual flyweights in unusual configurations, rather than as conventional ball-shaped weights. Thus, in the forms of governor illustrated herein by way of example, the flyweights are shaped and formed to afford great mass in a small circular compass about a governor shaft. In fact, the flyweights in a sense embrace or follow around the main governor shaft by which they are supported. The housing is accordingly exceedingly small for the work capacity of the governor.

A further advantage present in governors constructed according to this invention resides in the fact that the speeder spring, despite the provision for adjusting both its tension and its relative lever arm, is so mounted that it will not cock or flex laterally and will thus maintain a straight line governing characteristic.

The manner in which the flyweights are mounted and guided and the mode of connecting between them and the terminal lever is such that a uniform terminal lever movement accompanies given speed changes and this greatly facilitates close regulation.

Numerous other objects and advantages of the governors herein illustrated and described will occur to those skilled in the art from a perusal of the ensuing description and the accompanying drawings, wherein several complete and specific embodiments are set forth by way of example. However, it is to be understood that the spirit and scope of the present invention is not limited to the forms shown and described, or otherwise than as defined in the appended claims.

In the accompanying drawings:

Fig. 4 is a view similar to Fig. 1 of another form of the governor of the present invention;

Fig. 5 is a detailed elevational view, partly in cross section, showing a modification of the flyweight arrangement of the governor of Fig. 4;

Fig. 6 is a top plan view of the arrangement of Fig. 5; and,

Fig. 7 is a horizontal cross-sectional view taken on the line VII—VII of Fig. 5.

Figure 1:
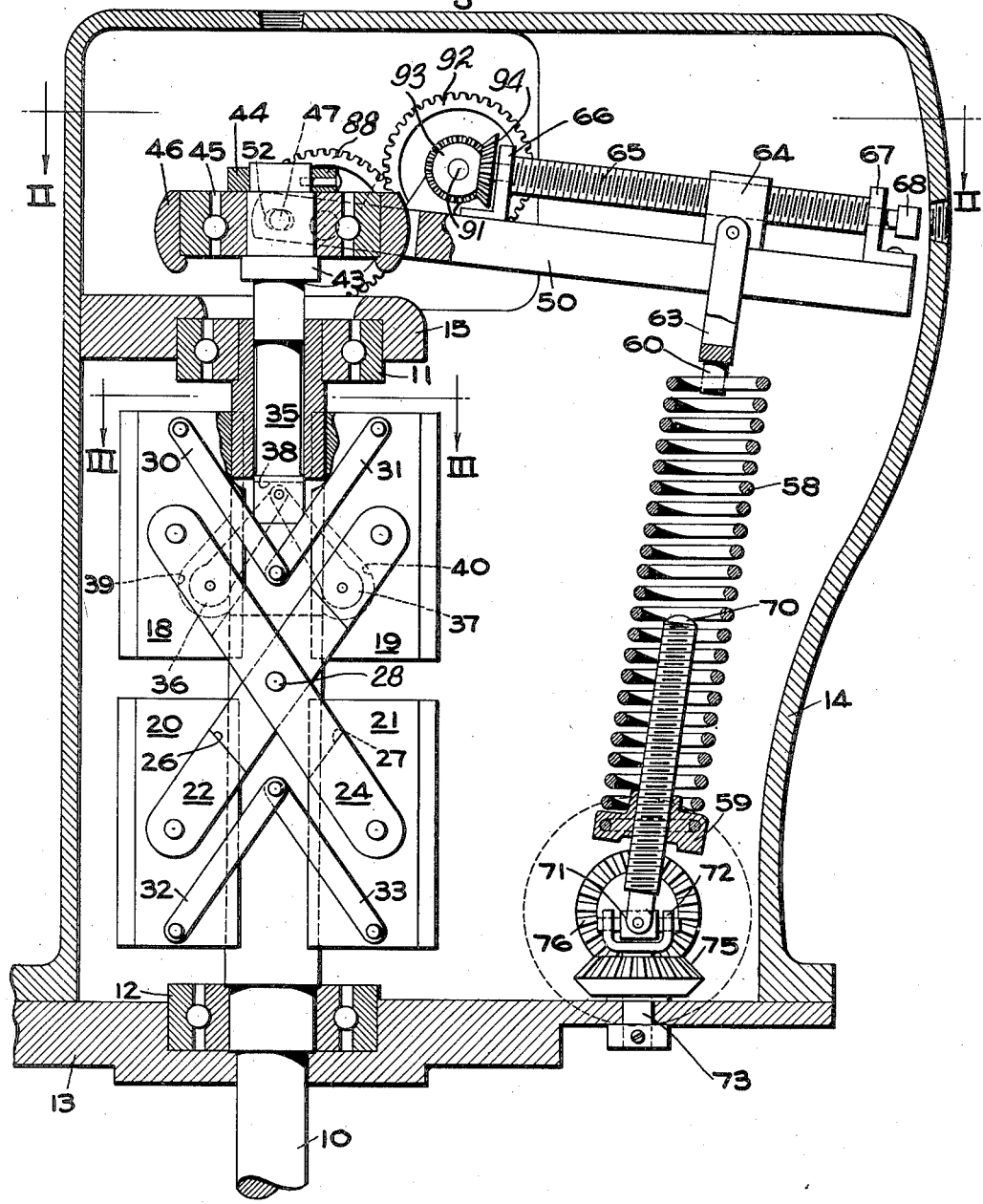
Fig. 1 is a general vertical cross-sectional view of one form of the governor of the present invention.
Figure 2:
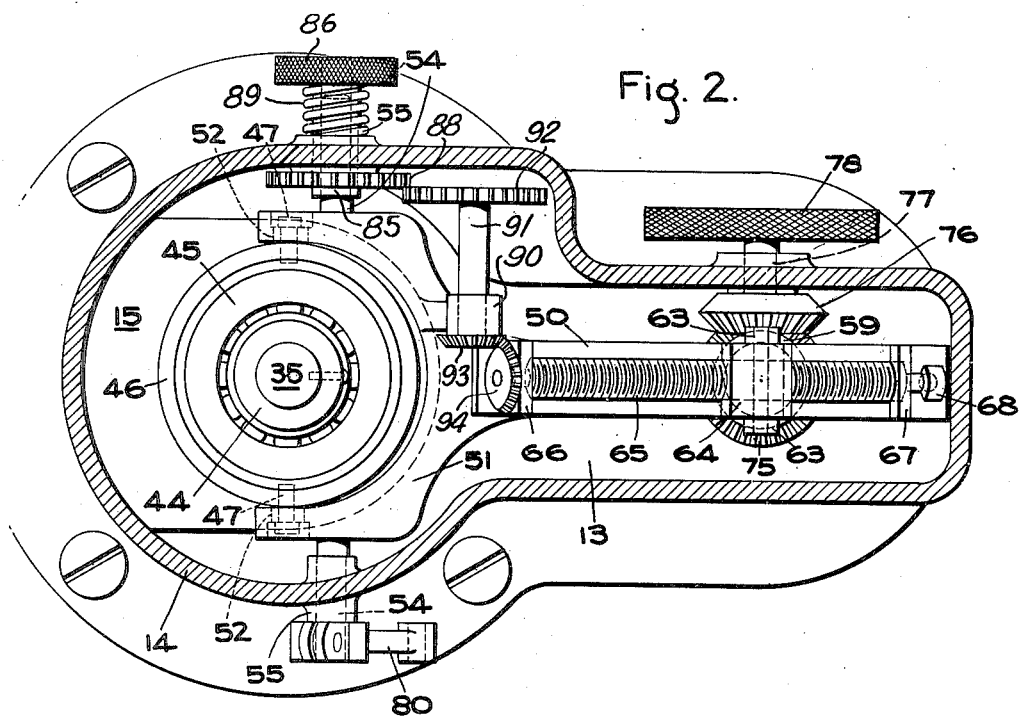
Fig. 2 is a cross-sectional view taken on the line II—II of Fig. 1.
Figure 3:
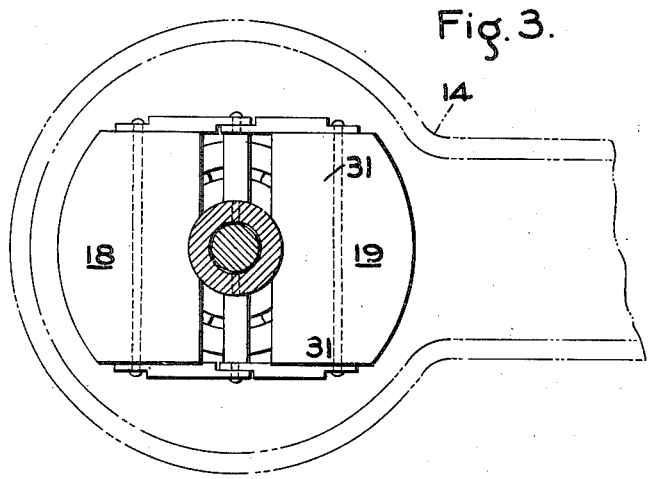
Fig. 3 is a fragmentary cross-sectional view taken on the line III—III of Fig. 1.

Throughout the several figures of the drawing like characters of reference denote like parts and in the embodiment of Figs. 1, 2 and 3, the numeral 10 designates a governor drive shaft journaled in anti-friction bearings 11 and 12 at its upper and lower ends, respectively. The lower bearing 12 is supported in a base or mounting plate 13 and a housing or casing 14 is secured to plate 13, as by means of screws or the like (not shown), to encase the governor mechanism. The upper bearing 11 is supported in a bracket 15 which is rigidly secured to an interior wall of housing 14 in any desired manner.

The governor drive shaft 10 is driven from an engine or other prime mover to be governed, or from any other source involving a factor of speed subject to fluctuation, wherein it is desired to control apparatus according to the speed fluctuations. By way of example, reference will be had herein to governors applied to engines having variable fuel throttle controls which may be automatically adjusted in accordance with variations in speed. Such undesired changes of speed are usually caused by changes in the load on the engine or other prime mover, so that an increase in load causes a slowing of the engine and calls for a further opening of the throttle to restore the engine to desired speed.

The speed-sensitive or speed-responsive means of the governor of Figs. 1 through 3 comprise four flyweights designated 18 through 21, arranged to provide an upper pair 18 and 19 and a lower pair 20 and 21. The weights 19 and 20 are primarily supported by a pair of levers 22 at opposite sides thereof. The weight 19 is pivotally attached to corresponding ends of levers 22 and the weight 20 is pivotally attached to the opposite ends of levers 22.

A second pair of levers 24 support weights 18 and 21 in a similar manner and the set of levers 22 and 24 at each side of the flyweights is notched, as at 26 and 27, respectively, so that the levers may lie in substantially the same plane. A common pivot pin 28 extends through the shaft 10 and the four levers 22 and 24 to support the flyweights in such a manner that they may move away from shaft 10 under the influence of centrifugal force produced through rotation of shaft 10, by oscillation of levers 22 and 24.

It is desired, in constructing the governor of the present invention, that the flyweights 18 through 21 shall always retain their vertically erect position, regardless of their distance from or proximity to the shaft 10. To this end each of the flyweights 18 through 21 has a link, designated respectively 30 through 33, connecting pivotally with shaft 10. The several links have the same effective lever arms as the opposite arms of each lever 22, 24 and extend parallel thereto, so that, in effect, each flyweight has a pantograph connection with shaft 10 and extends parallel thereto regardless of its spacing from the shaft 10.

With the levers and links thus far described the weights 18 and 21 must move equal distances toward and from the shaft 10 in synchronism and the weights 19 and 20 must likewise move in synchronism with respect to each other. It is desired that all four weights shall be so constrained and this end is accomplished by the manner in which a pair of the flyweights, in the present instance the weights 18 and 19, are connected to a speeder rod 35. The rod 35 is axially movable in a bore formed in shaft 10 and a pair of links 36 and 37 each have an end pivotally disposed in a bifurcation 38 formed in the lower end of speeder rod 35. The shaft 10 is transversely slotted to accommodate the links 36 and 37 and each has its outer end pivotally engaged in one of the central notches 39 and 40 formed in the weights 18 and 19, respectively.

Since the links 36 and 37 have a common pivotal connection with speeder rod 35 and are alike as to length, they form a further parallelogram linkage with the upper ends of levers 22 and 24 and constrain the levers 22 and 24 to synchronous movement of all four flyweights.

Because of the continuously erect or vertical position which the flyweights are constrained to assume at all times, they may be of the elongate form shown and, as appears from Fig. 3, may be actually formed to fit partially about shaft 10. This gives an extremely high rotating mass within a small radial limit and makes for a highly efficient governor construction.

Further, the particular linkage and leverage employed for supporting the flyweights 18 through 21 and for defining their centrifugal movement is such that a very slight centrifugal movement of the flyweights gives a substantial axial actuation of the speeder rod. It will be noted that as the upper weights move outwardly they also move downwardly as viewed in Fig. 1, and thus two components of axial movement are imparted to speeder rod 35 through links 37. This makes for extreme accuracy of governing and the resultant governor is more sensitive and at the same time has greater stability than centrifugal mechanical governors heretofore known and used.

A collar 43 formed on speeder rod 35 and a second collar 44 pinned thereto as shown in Fig. 1, or otherwise secured, serve to fasten the speeder rod axially to the inner race of a ball bearing 45, the outer race of which is contained within a trunnion collar 46 having oppositely extending trunnion pins 47. A speeder lever 50 has a forked end 51 whose opposite projections are longitudinally slotted as at 52 to engage the trunnion pins 47. The speeder lever 50 has secured rigidly thereto in any desired manner a pair of oppositely extending fulcrum pins 54 which are journaled in bearings 55 formed in the housing 14 and which pivotally support the lever 50.

The outer end of lever 50 is provided with novel spring biasing means which tend to rotate the speeder lever in a clockwise direction as viewed in Fig. 1. It will be noted that this bias is opposed to the action of centrifugal force on the flyweights 18 through 21 which tends to pull downwardly on speeder rod 35 and accordingly tends to rotate lever 50 in a counterclockwise direction as viewed in Fig. 1. The novel means for mounting and adjusting the biasing effect of the spring biasing means will now be described.

Referring to Fig. 1, the numeral 58 designates an extension coil spring having one end securely attached to an internally threaded collar 59 and its opposite ends clamped between opposed gripping elements 60 which extend from the bottom of an upwardly bifurcated yoke 63. The upper ends of yoke 63 are pivoted to opposite sides of a nut 64 which slides along lever 50 when a screw 65, which extends through nut 64, is rotated. The screw 65 is positioned on lever 50 by a pair of bearing brackets 66 and 67 which support the screw against axial displacement but permit free rotation. A headed end 68 of screw 65 facilitates rotation thereof to slide nut 64 along lever 50 and accordingly vary the effective lever arm of the tensile force of spring 58 against lever 50 and against the centrifugal flyweight mechanism. This adjustment determines the "sensitivity" setting of the governor, that is, the amount of adjustment of position which the flyweights will make for a given load or speed change.

The collar 59 at the lower end of spring 58 is internally threaded to receive a screw 70, the head end of which is bifurcated and pivotally attached to a block 71 which is supported in a U-shaped bracket 72, the latter being in turn secured to a stub shaft 73 journaled in the housing base plate 13. The shaft 73 has a bevel pinion 75 secured thereto and a meshing companion pinion 76 is fixed to a second stub shaft 77 journaled in the wall of housing 14, see Fig. 2. Externally of housing 14 shaft 77 is provided with a manipulating knob 78.

It is believed obvious from the foregoing that manipulation of knob 78 in opposite directions will move collar 59 along screw 70 to vary the initial tension of spring 58 and this tension will determine the speed setting of the governor. Increasing the tension of spring 58 increases the speed to which the governor will hold a prime mover to which it is connected, and vice versa. The knob 78 is also employed for synchronization in multiple prime mover installations.

It will be noted that the speeder lever pivot pins 54 project beyond the bearings 55 at the outside of casing 14. This permits the attachment of a terminal arm 80 to a pivot pin 54 at one side of casing 14. The terminal arm 80 may be connected to the fuel control mechanism of a prime mover or to any other control means in other governor adaptations.

At the other side of lever 50 the pivot pin 54 is arranged to cooperate with means for selectively and quickly adjusting the "sensitivity" setting of the governor by rotation of the screw 65. Such means will now be described and, as will appear, makes it possible to adjust sensitivity during operation and regardless of the position of lever 50 at the time that an adjustment is desired. At this side of casing 10 the bearing 55 has a larger bore whereby to receive a sleeve 85 which terminates outwardly in a manipulating knob 86. The sleeve 85 is disposed for free rotation about the adjacent pivot pin 54 and has fixed to its inner end a pinion 88. The sleeve assembly is normally urged outwardly to the position illustrated in Fig. 2 by a compression coil spring 89. A bearing 90 carried by lever 50 receives a stub shaft 91 which has fixed thereto a mating pinion 92 for meshing engagement with pinion 88. At its other end shaft 91 has a bevel gear 93 which meshes with a bevel gear 94 fixed to screw 65.

When it is desired to adjust the "sensitivity" setting by means of knob 86 the pinions may be brought into meshing engagement, regardless of the inclination of lever 50, by depressing knob 86 against the resistance of spring 89. Screw 65 may then be freely rotated by rotation of knob 86.

Reference will now be had to the embodiment of the governor of the present invention illustrated in Fig. 4 wherein only a single flyweight is provided at each side of the main shaft but wherein, as in the previously described embodiment, means are provided whereby the flyweights retain their vertical erectness in all phases of operation.

In Fig. 4 the numeral 100 designates a governor drive shaft journaled in anti-friction bearings 101 and 102 at its upper and lower ends, respectively. The lower bearing 102 is supported in a base or mounting plate 103 and a housing or casing 104 is secured thereover in any desired manner. The upper bearing 101 is carried by a bracket 105 which projects rigidly from the inner wall of casing 104.

The speed-sensitive or speed-responsive means of the governor of Fig. 4 comprises a pair of flyweights 108 and 109 and each is supported by parallelogram linkage which connects pivotally with shaft 100. In the case of flyweight 108 upper and lower links 110 and 111 are provided in the case of flyweight 109 upper and lower links 112 and 113. The several links support the flyweights for movement toward and away from shaft 100 in a manner which retains their parallelism with respect to shaft 100 at all positions of the flyweights.

The upper end of shaft 100 is bored to receive a speeder rod 116 which is free to move axially therein and is connected to the flyweights 108 and 109 by links 117 and 118, respectively. For convenience the links 117 and 118 may have common pivotal connection with links 110 and 112 at the flyweights 108 and 109. In addition to translating radial movement of the flyweights to axial movement of speeder rod 116, the links 117 and 118 cooperate with the parallelogram linkage to synchronize the radial movements of the flyweights 108 and 109 with respect to each other.

As the weights 108 and 109 move outwardly about the supporting links 110 through 113 they have a considerably greater component of downward movement as viewed in Fig. 4. This is due to the fact that the links 110 through 113 are initially somewhat closer to the horizontal than to the vertical. This produces a much amplified axial movement of speeder rod 116. The fact that, especially as higher speeds are attained, the greater part of the centrifugal force of the weights is absorbed by the links as a horizontal component, rather than by the governor spring mechanism, permits vastly wider speed range adjustment that has heretofore been considered possible in centrifugal governors.

This increase in choice of speed range or fluctuation permits the use of the present centrifugal governor in application heretofore considered unfeasible. In one instance a governor of the present type having a fluctuation of nearly two hundred per cent may be employed in a railway locomotive to automatically vary the lead of the valves as the locomotive operates at various speeds. The wide speed range of operation likewise makes the present governor available for controlling automotive vehicle operation.

In designing governors of the present invention for particular uses the initial or mean inclination of the supporting links will be determined by the relative importance of range of fluctuation as contrasted with extreme sensitivity.

If the center of gravity of the weights 108 and 109 be disposed at a point midway between the pivotal connections of links 117 and 111 with flyweight 108 and midway between the pivotal connections of links 118 and 113 with flyweight 109, the links 110 and 112 may be omitted for purposes of simplification.

A collar 120 formed on speeder rod 116 and a threaded collar 121 engaging the end of the speeder rod serve to secure it axially to the inner race of a ball bearing 122, the outer race of which is pressed into a guide plate 123. The plate 123 is vertically guided by sliding upon pins 124 screwed into or otherwise fixed to bracket 105.

A speeder lever 126 has a fixed intermediate pivot 127 supported by the wall of casing 108 and one of its arms 128 has its outer end connected to plate 123 by means of links 129. The other arm 130 of lever 126 connects pivotally with one end of a spring rod 131 and the details of a special speeder spring arrangement will presently be described.

It will be noted that arm 130 of lever 126 extends at an oblique angle with respect to rod 131 so that increases in speed, which tend to produce counterclockwise oscillation of lever 126 as viewed in Fig. 4, materially shorten the effective lever arm of arm 130. Thus unusual sensitivity is provided throughout the range for which the governor is set, since the lever arm of the spring is reduced as its tension increases.

The speeder spring proper, designated generally 133, is made up of three sections, 134, 135 and 136, connected in end-to-end relationship. The connection may be by means of collars 138 and 139 into which the ends of the springs may be cast or otherwise embedded or secured. The collars 138 and 139 slide about rod 131 and cooperate further therewith in a manner which will presently appear.

As shown in Fig. 4, the top end of spring section 134 is fixed to rod 131 in any desired manner and the bottom end of spring section 136 engages the eye of an eye bolt 140. Eye bolt 140 threads into a bushing 141 which has an enlargement at its lower end and a bevel gear 142 pinned to its upper end, whereby the gear and bushing assembly are freely rotatable with respect to base plate 103. A mating pinion 144 and a manipulating knob 145 are journaled in casing 108, in the same manner as pinion 76 and knob 78 of the embodiment of Figs. 1 and 2, and manipulation of knob 145 adjusts eye bolt 140 axially in an obvious manner.

The adjustment afforded by the means just described affords a very wide speed range and the manner of adjusting to determine speed range will now be further set forth. It will be noted that spring 134 is of relatively small gage wire, spring 135 of heavier gage, and spring 136 of still heavier gage. Rod 131 is provided with fixed enlargements or collars 150 and 151.

With the eye bolt 140 in the illustrated position the adjustment is for the low speed range and spring 134 will take the major part of the flexure due to changes in speed of shaft 100. If eye bolt 140 be adjusted downwardly as viewed in Fig. 4 until collar 150 on rod 131 engages the collar 138 which connects springs 134 and 135, spring 134 is in effect cut out of further action. This is the setting for the intermediate speed range and intermediate spring 135 then takes the major part of the flexure.

Still further downward adjustment of eye bolt 140 brings collars 151 and 139 into abutment, and then heavy spring 136 takes all further variations in load. This is the high speed range setting.

Figs. 5, 6 and 7 illustrate a modification of the lever arrangement of Fig. 4 aimed at still greater compactness and further illustrate resilient means urging the flyweights directly toward each other. In this way the main centrifugal urge of the flyweights is borne directly by the flyweight springs and only the changing forces due to speed variation need be transmitted to the speed regulating or "speeder" spring. This eliminates much of the frictional forces otherwise developed in the linkage and leverage between the flyweights and the speeder spring.

Referring to Figs. 5, 6 and 7, the numerals 160 and 161 designate a pair of flyweights associated with a governor drive shaft 162. Flyweight 160 is provided with upper and lower parallel links 163 and 164 and flyweight 161 is provided with upper and lower links 165 and 166. The links 163 through 166 are offset at their interengaging ends as shown in Fig. 7, where they are jointly pinned to shaft 162 as indicated at 168.

Straddling links 163 through 166 are pairs of links 170 and 171 which have common pivotal connection with the flyweights and the lower links 164 and 166. At their upper ends links 170 and 171 engage pivotally with a bar 173 which is fixed to a speeder rod 174 which is axially slidable in shaft 162.

In the illustrated instance the flyweights 160 and 161 are formed with openings to accommodate upper and lower pairs of extension springs 175 and 176 which have their opposite ends pinned to the flyweights 160 and 161. As previously stated, these springs take all of the centrifugal force up to the lowest speed at which the governor is intended to operate, while a speeder spring like that of either Figs. 1 or 4 takes the centrifugal force due to variations from the lowest to the highest operating speed.

What is claimed is:

1. Centrifugal governor mechanism comprising a rotatable drive shaft, a pair of centrally pivoted crossed levers having their central pivot carried by said shaft, a fly-weight pivotally supported at each outer end of each of the crossed levers, means normally urging said fly-weights toward said shaft, means for synchronizing the oscillation of the two levers away from and toward said shaft under the influence of varying centrifugal force on said fly-weights occasioned by variations in the speed of rotation of said shaft, and a link spaced from said levers connecting pivotally between each fly-weight and the drive shaft for maintaining the fly-weights in a constant attitude during movements of the fly-weights toward and away from the drive shaft.

2. Centrifugal governor mechanism comprising a rotatable drive shaft, a pair of centrally pivoted crossed levers having their central pivot carried by said shaft, a fly-weight pivotally supported at each outer end of each of the crossed levers, means normally urging said fly-weights toward said shaft, and a link spaced from said levers connecting pivotally between each fly-weight and the drive shaft for maintaining the fly-weights in a constant attitude during movements of the fly-weights toward and away from the drive shaft.

3. Centrifugal governor mechanism comprising rotatable drive means and a fly-weight at each side thereof and supported thereby, a pair of supporting arm elements for each fly-weight, each arm element extending pivotally between the drive means and its fly-weight and the pair of arm elements of each fly-weight being spaced along the axis of the drive means and parallel to each other whereby each fly-weight maintains a constant attitude with respect to the axis of rotation during movement toward and away from said axis under the influence of varying centrifugal force on said fly-weights occasioned by variations in the speed of rotation of said drive means, and means normally urging said fly-weights toward said axis.

4. Centrifugal governor mechanism comprising rotatable drive means and a fly-weight at each side thereof and supported thereby, a pair of supporting arm elements for each fly-weight, each arm element extending pivotally between the drive means and its fly-weight and the pair of arm elements of each fly-weight being spaced along the axis of the drive means and parallel to each other whereby each fly-weight maintains a constant attitude with respect to the axis of rotation during movement toward and away from said axis under the influence of varying centrifugal force on said fly-weights occasioned by variations in the speed of rotation of said drive means, a speeder rod movable axially with respect to said drive means, means connecting said fly-weights and supporting arms with said speeder rod whereby inward and outward movements of the fly-weights produce axial movements of the speeder rod, and means acting against said speeder rod for normally urging said fly-weights toward said axis.

5. Centrifugal governor mechanism comprising a rotatable drive shaft and a fly-weight at each side thereof and supported thereby, each fly-weight comprising an elongate block extending substantially parallel to the drive shaft and adapted to lie closely adjacent said shaft, a pair of supporting arm elements for each fly-weight, each arm element extending pivotally between the drive means and its fly-weight and the pair of arm elements of each fly-weight being spaced along the axis of the drive means and parallel to each other whereby each fly-weight maintains a constant parallel attitude with respect to the drive shaft during movement toward and away from said axis under the influence of varying centrifugal force on said fly-weights occasioned by variations in the speed of rotation of said drive means, and means normally urging said fly-weights toward said shaft.

6. Centrifugal governor mechanism comprising a rotatable drive shaft, a pair of centrally pivoted crossed levers having their central pivot carried by said shaft, a fly-weight pivotally supported at each outer end of each of the crossed levers, each fly-weight comprising an elongate block extending substantially parallel to the drive shaft and adapted to lie closely adjacent said shaft, means normally urging said fly-weights toward said shaft, means for synchronizing the oscillation of the two levers away from and toward said shaft under the influence of varying centrifugal force on said fly-weights occasioned by variations in the speed of rotation of said shaft, and a link spaced from said levers connecting pivotally between each fly-weight and the drive shaft for maintaining each fly-weight in an attitude parallel to said shaft during movements of the fly-weights toward and away from the drive shaft through oscillation of the supporting levers.

7. Centrifugal governor mechanism comprising rotatable drive means and two fly-weights supported at each side of the axis of rotation thereof, a pair of supporting arm elements for each fly-weight, each arm element extending pivotally between the drive means and its fly-weight and the pair of arm elements of each fly-weight being spaced along said axis and parallel to each other whereby each fly-weight maintains a constant attitude with respect to the axis of rotation during movement toward and away from said axis, means for synchronizing the movement of the several fly-weights toward and away from said axis under the influence of varying centrifugal force on said fly-weights occasioned by variations in the speed of rotation of said drive means, and means normally urging said fly-weights toward said axis.

8. Centrifugal governor mechanism comprissing rotatable drive means and two fly-weights supported at each side of the axis of rotation thereof, a pair of supporting arm elements for each fly-weight, each arm element extending pivotally between the drive means and its fly-weight and the pair of arm elements of each fly-weight being spaced along said axis and parallel to each other whereby each fly-weight maintains a constant attitude with respect to the axis of rotation during movement toward and away from said axis, means for synchronizing the movement of the several fly-weights toward and away from said axis under the influence of varying centrifugal force on said fly-weights occasioned by variations in the speed of rotation of said drive means, and means normally urging said fly-weights toward said axis, the arm elements of a fly-weight at one side of said drive means being disposed oppositely from the other fly-weight at the same side of the drive means with respect to the axis of the drive means, whereby end thrust on the drive means is substantially eliminated.

9. Centrifugal governor mechanism comprising rotatable drive means and two fly-weights supported at each side of the axis of rotation thereof, a pair of supporting arm elements for each fly-weight, each arm element extending pivotally between the drive means and its fly-weight and the pair of arm elements of each fly-weight being spaced along said axis and parallel to each other whereby each fly-weight maintains a constant attitude with respect to the axis of rotation during movement toward and away from said axis, a speeder rod movable axially with respect to said drive means, means connecting said fly-weights and supporting arms with said speeder rod whereby inward and outward movements of the fly-weights produce axial movements of the speeder rod and the movements of the several fly-weights toward and away from said axis are synchronized, and means acting against said speeder rod for normally urging said fly-weights toward said axis.

10. Centrifugal governor mechanism comprising rotatable drive means and a fly-weight at each side thereof and supported thereby, a pair of supporting arm elements for each fly-weight, each arm element extending pivotally between the drive means and its fly-weight and the pair of arm elements of each fly-weight being spaced along the axis of the drive means and parallel to each other whereby each fly-weight maintains a constant attitude with respect to the axis of rotation during movement toward and away from said axis under the influence of varying centrifugal force on said fly-weights occasioned by variations in the speed of rotation of said drive means, a speeder rod movable axially of said rotatable drive means, and a link connecting the fly-weight and supporting arm elements with the speeder rod for axial movement of the latter by the former.

ARMIN H. RODECK.
ALBERT G. MASSEY.

REFERENCES CITED

The following references are of record in the file of this patent:

UNITED STATES PATENTS

| Number | Name | Date |
|---|---|---|
| 202,892 | Towns | Apr. 23, 1878 |
| 1,019,007 | Klein | Feb. 27, 1912 |
| 1,334,902 | Howe | Mar. 23, 1920 |
| 1,463,909 | Rivers | Aug. 7, 1923 |
| 1,878,305 | Utne | Sept. 20, 1932 |
| 2,134,758 | Hobart | Nov. 1, 1938 |
| 2,250,983 | Adler | July 29, 1941 |
| 2,261,332 | Bone | Nov. 4, 1941 |
| 2,288,382 | Adler | June 30, 1942 |

FOREIGN PATENTS

| Number | Country | Date |
|---|---|---|
| 11,749 | Great Britain | July 23, 1889 |
| 410,705 | Great Britain | May 24, 1934 |
| 331,810 | Germany | Jan. 12, 1921 |